UNITED STATES PATENT OFFICE.

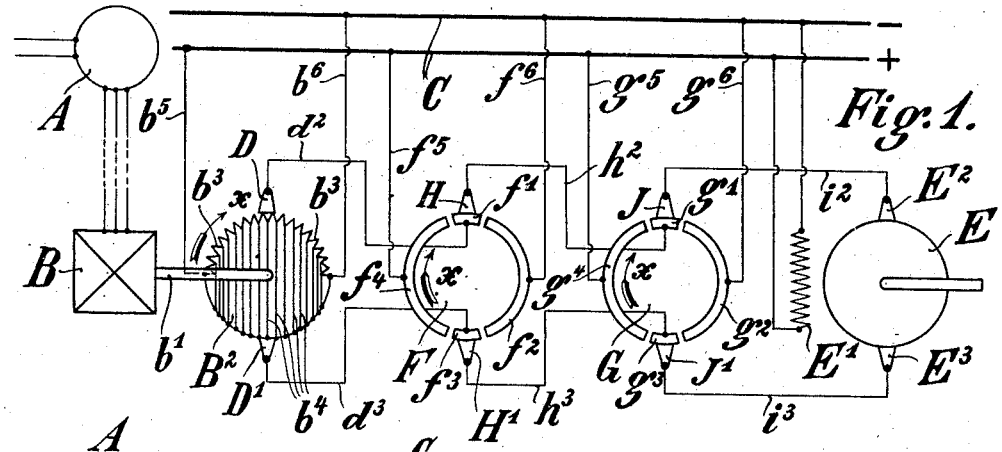
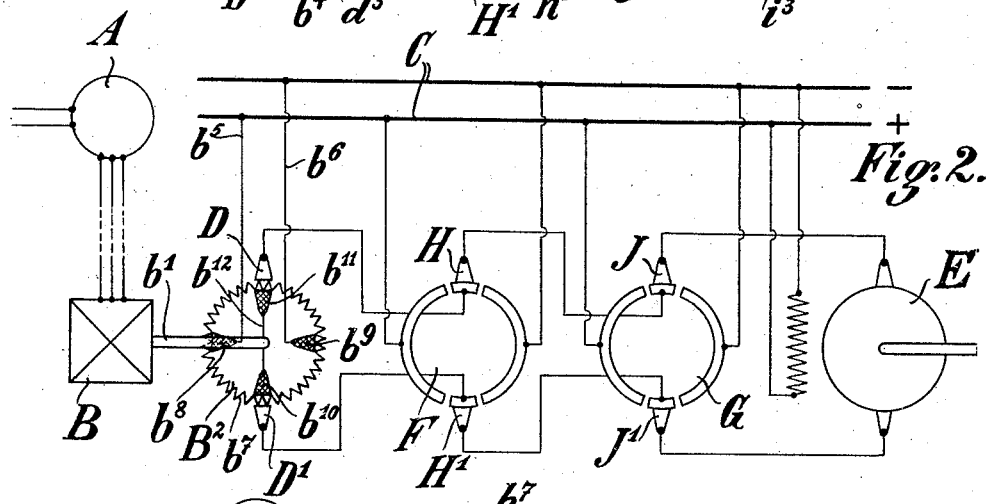
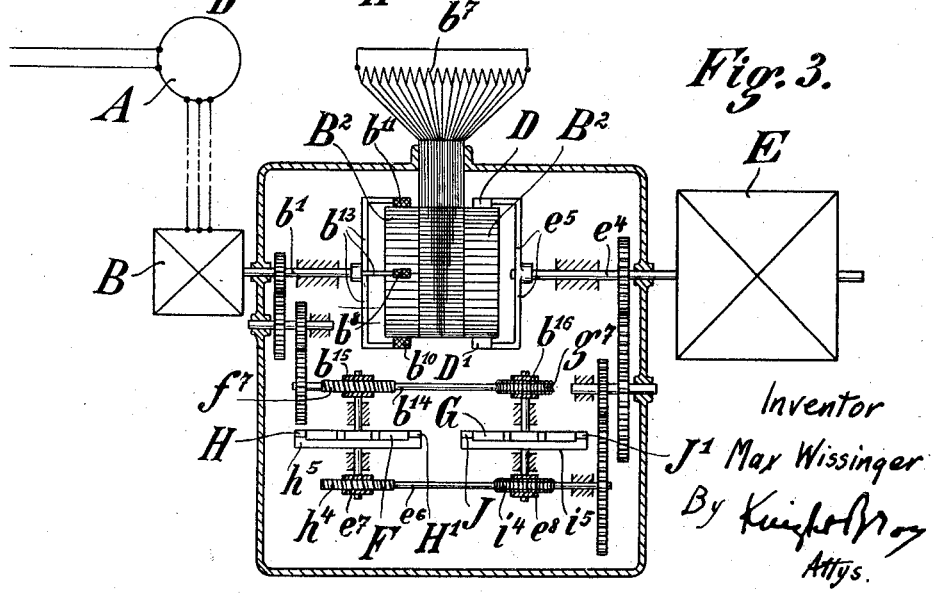

MAX WISSINGER, OF ESSEN, GERMANY, ASSIGNOR TO FRIED. KRUPP AKTIENGESELLSCHAFT, OF ESSEN-ON-THE-RUHR, GERMANY.

ELECTRICAL CONTROL APPARATUS.

1,424,702.  Specification of Letters Patent.  Patented Aug. 1, 1922.

Application filed September 8, 1920. Serial No. 408,958.

*To all whom it may concern:*

Be it known that I, MAX WISSINGER, residing at Essen, Germany, a citizen of the German Republic, have invented a certain new and useful Improvement in Electrical Control Apparatus, (for which I have filed application in Germany March 16, 1918), of which the following is a specification.

This invention relates to apparatus particularly intended for the adjustment of a distant continuous current meter. In known apparatus of this kind, the armature brushes of the motor, which is to be adjusted, are shifted out of the position of rest into the running position by means of an auxiliary motor, after which they have to be returned to the position of rest by the motor armature itself. This circumstance precludes the employment of normal continuous current motors, renders the working of the motor without sparking difficult and in the case of large motors requires a considerable expenditure of power to adjust the brushes. The object of this invention is to provide an apparatus of the kind herein before mentioned, which is free from the disadvantages of the known apparatus and is distinguished in addition to its great simplicity, by its reliable and accurate method of working. The invention also enables the range of adjustment of the continuous current motor to be increased to any extent that may be desired, without the simplicity of the apparatus suffering thereby.

The invention will be described with reference to the accompanying drawings, in which—

Figures 1 and 2 show the diagrams of connections of two constructions of the invention and Figure 3 shows diagrammatically the mutual arrangement and connection of the parts of the diagram of connections shown in Figure 2, and chiefly also of the parts shown in the diagram Fig. 1.

The construction shown in Figure 1 will be described first.

A denotes the transmitter and B is the receiver (hereinafter termed the auxiliary motor) of a synchronously working long-distance adjusting apparatus constructed like an alternating current system. Upon the armature shaft $b^1$ of the auxiliary motor B is fixed a cylindrical body $B^2$ like a collector. On one half of the outer surface of the collector body $B^2$, the adjacent collector plates are connected by the parts of a resistance $b^3$, while the corresponding plates of the periphery are electrically separated. The plates connected to each other by the resistance $b^3$ on the one half are connected to the symmetrically situated plates of the other half by conductors $b^4$ in the manner shown in the drawing. The two ends of the resistance $b^3$ are connected by two slip rings (not shown) and conductors $b^5$, $b^6$ to a continuous current main C. Upon the collector $B^2$ bear two brushes D and $D^1$, which are situated diametrically opposite each other and are connected to a common holder (not shown.) The common holder of the brushes D and $D^1$ is positively mechanically connected to the armature E of a continuous current motor for adjusting an object (e. g. a gun or a searchlight) and hereinafter termed the principal motor, so that it rotates with the same angular velocity. The manner in which this may be accomplished mechanically is shown in Fig. 3, though this figure in certain other details refers more particularly to Fig. 2. The corresponding reference letters in Fig. 3 are however, the same as in Fig. 1. The principal motor is excited by an exciting winding $E^1$ connected to the main C. To the armature shaft $b^1$ of the auxiliary motor B are positively connected, by an intermediate gearing similar to that shown for instance in Fig. 3, two cylindrical discs F and G, of suitable non-conducting material, into the outer face of each of which is inserted a set of four conducting contact strips $f^1$, $f^2$, $f^3$, $f^4$ and $g^1$, $g^2$, $g^3$, $g^4$ respectively. All contact strips, which are located diametrically opposite each other, include similar angles as shown in the drawing, those letters $f^1$, $f^3$ and $g^1$, $g^3$ extending over a comparatively small and the others lettered $f^2$, $f^4$ and $g^2$, $g^4$ extending over a comparatively large peripheral portion. The ratio of transmission between the collector body $B^2$ and the discs F and G is so determined, that a series of complete revolutions of the collector $B^2$ corresponds to a single complete revolution of the disc F and a series of complete revolutions of the disc F to a single complete revolution of the disc G. The ratios are also so determined that the entire range of adjustment of the transmitter A corresponds to one revolution of the disc G, after which the brushes J J¹, which at the beginning of the adjustment bear upon the contact strips $g^1$ $g^2$ have arrived at the contact strips $g^4$ $g^2$ and rest upon the ends of these contact strips. On each of the discs F and G and contacting therewith in the manner shown in the drawing are a pair of brushes H, H¹ and J, J¹ respectively, the members of each pair being situated diametrically opposite each other and the width of said brushes slightly exceeding the width of the insulating distance piece between the corresponding contact strips. The brushes H, H¹ and also the brushes J, J¹ are respectively mounted on a common holder, which holders are mechanically positively connected by an intermediate gearing (similar to the manner shown in Fig. 3) with the armature E of the principal motor so that they rotate in the same direction as this latter. The ratios of transmission between the holder of the brushes D, D¹, which we have seen, rotates at the same speed as the armature E of the principal motor, and the holders of the brushes H, H¹, and J, J¹ are exactly the same as those between the collector B² and the discs F and G respectively. From the brushes D, D¹ which bear upon the collector B² conductors $d^2$ and $d^3$ lead to the short contact strips $f^1$ and $f^3$ of the disc F and from the brushes H and H¹ conductors $h^2$ and $h^3$ lead to the corresponding short contact strips $g^1$ and $g^3$ of the disc G. The brushes J and J¹ are finally connected by conductors $i^2$ and $i^3$ to the brushes E² and E³ of the principal motor through slip rings (not shown). The long contact strips $f^2$, $f^4$ and $g^2$, $g^4$ are connected in suitable manner, for instance by means of slip rings (not shown) through conductors $f^5$, $f^6$ and $g^5$, $g^6$ to the continuous current main C.

The description of the action of the apparatus will be commenced from the state of the apparatus shown in the drawing, in which the brushes D, D¹ are connected to the same point of the resistance $b^3$ and in which the brushes H, H¹ and J, J¹ assume the angular position in respect to the discs F and G shown in the drawing. In this position of the parts mentioned the angular position of the armature E of the principal motor corresponds with the angular position of the adjustable part of the transmitter A and the armature circuit D, $d^2$, $f^1$, H, $h^2$, $g^1$, J, $i^2$, E², E, E³, $i^3$, J¹, $g^3$, $h^3$, H¹, $f^3$, $d^3$, D¹, $b^4$, D is devoid of current and short circuited.

If now for the purpose of adjusting the armature E and the object connected thereto (e. g. a gun or a searchlight) a rotation be imparted to the adjustable part of the transmitter A, this rotation is first taken part in only by the armature of the receiver B and the parts positively connected therewith, namely the collector B² and the discs F and G. The dimensions of the contact strips of the disc F are so determined, that with the ratios of transmission above mentioned between the collector B² and the disc F, the revolution of collector B² through an angle of 90° corresponds to a sufficient fraction of one whole revolution of the disc F, sufficient to bring the contact pieces $f^1$, $f^3$ just out of contact with the brushes H, H¹. At the commencement of the rotation of the collector B², as the brushes D, D¹ now bear on different points of the resistance $b^3$, the armature E receives current over $+C$, $b^5$, $b^3$, D, $d^2$, $f^1$, H, $h^2$, $g^1$, J, $i^2$, E², E, E³, $i^3$, J¹, $g^3$, $h^3$, H¹, $f^3$, $d^3$, D¹, $b^4$, $b^3$, $b^6$, $-C$, the magnitude of which current increases with the angle of rotation of the collector B² in like proportion. As soon as the torque of the armature E corresponding to this current and to the excitation of the principal motor E, E¹ is large enough, to overcome the mechanical resistance of the armature and the object which is to be adjusted, the armature E is set in motion in the same direction of rotation as the collector B². The rotation of the armature E is taken part in by the brushes D, D¹, H, H¹ and J, J¹ which move in the same direction of rotation, the brushes D, D¹ rotating with the same angular velocity as the armature E, while the brushes H, H¹ and J, J¹ possess the ratios of transmission before mentioned corresponding to lesser angular velocities. As the angular velocity of the armature E at the commencement of its rotation is still less than that of the collector B², this latter will first continue its relative rotation with respect to the rotating brushes D, D¹, and the part of the resistance $b^3$ which is effective in the armature circuit will correspondingly decrease more and more. As soon as the collector B² is in advance of the brushes D, D¹, by an angle of 90° in the course of this relative rotation, and the two ends of the resistance accordingly rest beneath the brushes D, D¹, the whole of the resistance $b^3$ is switched out of the armature circuit. At the same instant however owing to the ratio of transmission existing between the collector B² and the disc F and owing to the dimensions above stated of its contact pieces, this disc has arrived in an angular position in which the contact strips $f^1$, $f^3$ are just out of contact with the brushes H, H¹. The circuit leading through the conductors $b^5$, $b^6$ and the brushes D, D¹ to the armature E is therefore broken, but its place is taken by a new circuit, which leads from the conductors $f^5$, $f^6$ and the contact strips $f^4$, $f^2$ to the brushes H, H¹. The replacement of the one circuit by the other takes place without any sparking, as the contact of the contact strips $f^1$, $f^3$ with the brushes H, H¹ is broken at the instant at which the contact between the contact strips $f^4$, $f^2$ with the brushes H, H¹ is made. As soon as the resistance $b^3$ has thus been completely cut out, the armature E attains its full angular velocity. For the sake of simplicity it will be first assumed that the full angular velocity of the armature E corresponds with the angular velocity of the adjustable part of the transmitter A and the collector B². In this case the brushes D, D¹ rotate with the same angular velocity as the collector B², the brushes H, H¹ with the same angular velocity as the disc F and the brushes J, J¹ with the same angular velocity as the disc G, and consequently no further relative rotation takes place between these complementary parts. The rotation of the armature E of the principal motor continues as long as the rotation of the adjustable part of the transmitter A and consequently also the rotation of the collector B² is continued. As soon as the adjustable part of the transmitter A is stopped, the armature of the receiver B and the parts positively connected thereto i. e. the collector B² and the discs F and G, also come to rest. During the retardation of the angular velocity of the transmitter A which precedes the stoppage, the angular velocity of the armature E is greater than that of the collector B², and the angular velocities of the brushes H, H¹ and J, J¹ accordingly also exceed those of their respective discs F and G. A relative rotation of the brushes D, D¹ H, H¹ and J, J¹ with respect to the corresponding bodies B², F and G consequently begins in the direction of the arrow $x$. During the course of this relative rotation, as soon as contact between the brushes H, H¹ and the contact strips $f^4$, $f^2$ ceases, and the brushes H, H¹ have again come in contact with the contact strips $f^1$, $f^3$, the current passes through the conductors $b^5$, $b^6$ and the brushes D, D¹ and the circuit connected therewith again takes the place of the circuit through the conductors $f^5$, $f^6$ and contact strips $f^4$, $f^2$. In this case also the replacement of one circuit by the other takes place without the formation of any sparking, as the armature circuit, the instant the contact strips $f^4$, $f^2$ are switched off, is again closed through the contact strips $f^1$, $f^3$. During the further course of the last mentioned relative rotation the resistance $b^3$ is gradually switched in again and the angular velocity of the armature E is correspondingly reduced. During the course of the switching in of the resistance $b^3$ and as soon as the brushes D, D¹ have again attained the angular position shown in the drawing, in which the entire resistance is switched into the circuit, the armature E is short-circuited and has consequently so powerful a brake put upon it that it generally comes to rest at once. Should it happen, for instance, in case of quick stoppage of the adjustable part of the transmitter A, that the armature E races under the action of inertia, beyond the short-circuit position, the direction of the current in the armature circuit is reversed and consequently the direction of rotation of the armature E and of the brushes D, D¹ is reversed also. Immediately on the backward rotation of the armature E, which now follows, the brushes D, D¹ have again moved into the angular position with respect to the collector B² shown in the drawings, the armature E is again short-circuited and as its angular velocity on its backward movement is only small, it now comes to rest with certainty. Since in the position of rest of the armature E, the relative position of the brushes D, D¹ H, H¹ and J, J¹ with respect of the collector B² and the discs F and G, is the same as before the commencement of the adjustment of the transmitter A, and as the angle of rotation of the collector B², coincides with that of the adjustable part of the transmitter A, the armature E when in its new position of rest will have passed over an angular path equal to the angular path of the adjustable part of the transmitter A.

In the above description of the action of the apparatus it has been assumed for the sake of simplicity, that the angular velocity of the armature E, from the instant the full current is supplied to it through the conductors $f^5$, $f^6$ and the contact strips $f^4$, $f^2$, corresponds with the angular velocity of the adjustable part of the transmitter A, and that accordingly for the subsequent part of the adjustment of the transmitter and the rotation of the armature E, there is no relative movement between the collector B², the discs F, G and the brushes D, D¹, H, H¹ and J, J¹ respectively. In practice this will not be the case. On the contrary the rotation of the armature E will take place at a speed which is different e. g. less than the angular velocity of the collector B². In this case, the collector B² and also the discs F and G will rotate more rapidly than their respective brushes D, D¹ H, H¹ and J, J¹, and consequently the contact pieces $f^4$ $f^2$ will finally be brought out of contact with the brushes H, H¹ before the system is brought to rest. The ratio of transmission between the discs F and G and the dimensions of the contact strips of the disc G are such that at the instant of separation of the contact pieces $f^4$, $f^2$ and of the brushes H, H¹, the disc G has rotated through an angle at which the contact strips $g^4$, $g^2$ have come into contact with the brushes J, J¹ and in which the contact between the contact strips $g^1$, $g^3$, and the brushes J, J¹ ceases. Thus the formerly existing circuit through the conductors $f^5$, $f^6$, the contact strips $f^4$, $f^2$ and the brushes H, H¹ is therefore broken and its place is taken by the new circuit through the conductors $g^5$, $g^6$ the contact strips $g^4$, $g^2$ and the brushes J, J¹. On the stoppage of the transmitter A the collector B² and the discs F and G come to rest at once, but the armature E, on the contrary, which owing to its slow rotation has lagged several revolutions behind the angular position of the transmitter A, continues its rotation together with the brushes D, D¹, H, H¹ and J, J¹ positively connected thereto at their respective ratios. During the course of this continued rotation the circuit through the conductors $g^5$, $g^6$, the contact strips $g^4$, $g^2$ and the brushes J, J¹ will be replaced again in a manner similar to that previously described with respect to the circuit through the conductors $f^5$, $f^6$, the contact strips $f^4$, $f^2$ and the brushes H, H¹. During the further rotation of the armature E the circuit through the conductors $f^5$, $f^6$ the contact strips $f^4$, $f^2$ and the brushes H, H¹ will then, as already described, be replaced by the circuit through the conductors $b^5$, $b^6$ the resistance $b^3$ and the brushes D, D¹ and the armature E finally comes to rest and all the brushes assume the angular position, with respect to the discs G and F and the collection-like body B² shown in the drawing. At this instant however the motor E has traversed an angular path which, for the reasons already given, is exactly equal to the angular path of the adjustable part of the transmitter.

The second construction, illustrated in Figures 2 and 3, differs from the first construction above described, in the arrangement of the collector B² and the brushes bearing thereon. In this construction the collector B² is arranged stationary and as is shown in Figure 2, provided with a closed resistance $b^7$. On the collector segments, to which the individual units of resistance $b^7$ are connected bear four brushes $b^8$, $b^9$, $b^{10}$ and $b^{11}$, which are fixed on a common holder rigidly connected to the armature shaft $b^1$ of the auxiliary motor B. Two of these brushes i. e. $b^8$ and $b^9$ are connected by slip rings (not shown) and by the conductors $b^5$, $b^6$ to the continuous current main C, and the remaining two brushes $b^{10}$ and $b^{11}$ are connected together by a conductor $b^{12}$. There also bear on the stationary collector B² two brushes D, D¹ situated diametrically opposite each other and mounted on a common holder fixed on the shaft of the armature E of the principal motor. The construction and arrangement of the principal motor E, the discs F and G and also of the corresponding brushes E², E³, H, H¹ and J, J¹ corresponds with the construction and arrangement of the corresponding parts of the modification shown in Fig. 1 and described hereinbefore. In Figure 3 which shows the arrangement and connection of the parts of the diagram of connections shown in Figure 2. A denotes the transmitter, B the auxiliary motor working as synchronous receiver, $b^1$ is the armature shaft of the auxiliary motor, $b^{13}$ the common holder for the brushes $b^8$, $b^9$, $b^{10}$, $b^{11}$, B² is the stationary collector, $b^7$ is the closed resistance, the parts of which are connected to the segments of the collector B², E is the principal motor, $e^4$ its armature shaft, $e^5$ the common holder provided for the brushes D and D¹ and mounted on the armature shaft of the principal motor. To the shaft $b^1$ of the auxiliary motor B, is positively connected by an intermediate reducing gearing, a shaft $b^{14}$ which serves to drive the discs F and G by means of two worm gearings $b^{15}$, $f^7$ and $b^{16}$, $g^7$. In a corresponding manner the shaft $e^4$ of the principal motor E is connected, by means of an intermediate reducing gearing, which reduces in the same ratio, to a shaft $e^6$ which by means of two worm gearings $e^7$, $h^4$ and $e^8$, $j^4$ serves to drive the brushes H, H¹ and J, J¹ fixed to the holders $h^5$ and $j^5$. The ratios of transmission of the worm gears $b^{15}$, $f^7$ and $e^7$, $h^4$ are equal to each other and a whole multiple of the ratios of transmission (likewise equal to each other) of the worm gearings $b^{16}$ $g^7$ and $e^8$ $j^4$. When the angular velocities of the armature shafts $b^1$ and $e^4$ are equal the discs F and G together with the corresponding brushes therefore also rotate with the same angular velocity.

As soon as the armature shaft $b^1$ of the auxiliary motor B is caused to rotate by the rotation of the adjustable part of the transmitter A, the brushes $b^8$, $b^9$, $b^{10}$, $b^{11}$ bearing on the stationary collector B² and also the discs F and G positively connected to the armature shaft $b^1$ (see Figure 3) take part in this rotation, while the armature E of the principal motor and consequently the brushes D, D¹ together with the brushes H, H¹ and J, J¹ positively connected to the armature shaft $e^4$ remain at rest. The armature E, which was previously devoid of current and short-circuited by the brushes $b^{10}$, $b^{11}$ receives at the same time a current through the brushes $b^8$, $b^9$ the resistance $b^7$ and the brushes D, D¹ and as soon as motor torque exceeds the mechanical resistance of the armature and of the object to be adjusted, the said armature also starts and sets the object to be adjusted in rotation. On the further rotation and stoppage of the adjustable part of the transmitter A the actions in the circuit and the movement of the armature E take place in the same manner described with reference to Fig. 1 and need not therefore be again described in detail. It is sufficient to point out that the armature E of the principal motor (exactly as in Fig. 1) continues its rotation until it has traversed an angular path equal to the angular path traversed by the adjustable part of the transmitter and therefore all the brushes again assume the mutual angular positions shown in the drawing in which the armature E is devoid of current and short-circuited.

Claims.

1. In an electrical apparatus for control of a direct current motor the combination with an operating device; a source of current for said motor, a starting resistance element adjustable by said operating device and connected to said current source, and means controlled by said operating device and circuit connections therefor, for conducting the current from said resistance to the motor, said means comprising brushes, in contact with said resistance and mechanically directly connected to the armature of said motor to move relatively to said resistance element, a commutating device (F) having a rotatable disc geared in suitable fixed relation to said operating device and provided with two oppositely disposed pairs of segments, one pair being of large size and being directly connected to said current source, the other pair being of smaller size and being connected to said resistance brushes, oppositely disposed contact brushes rotatable on said commutating device and geared to the motor armature in a relation similar to that of the commutator disk to the operating device, and electrical connection between said commutator brushes and the motor armature, the relative sizes between the two commutator segment pairs, and the relative gearing between the commutator and the operating device being such that the commutator brushes remain in contact with the small size segment pairs until the operating device has adjusted the resistance element from zero potential at its brushes to the maximum potential, whereafter the commutator brushes come into contact with the large commutator segments to receive the full current directly from said source.

2. In a control device of the character described the combination of a motor to be controlled, a source of current, an operating device and a resistance element adapted to be adjusted by said operating device, of a plurality of commutator discs (F, G) each having a pair of oppositely disposed small and large contact segments, and means for rotating said discs from said operating device whereby the rotation speed of the first disc (F) is a submultiple of the speed of the operating device, and the speed of the second disc (G) a submultiple of the speed of the first disc, the large segments of each disc being connected directly to said source of current, an oppositely disposed pair of brushes for each disc, the brushes (J, J¹) of the second disc being directly connected to the motor armature, the brushes (H, H¹) of the first disc being connected to the small segments of the second disc, an oppositely disposed pair of brushes (D, D¹) disposed on said resistance element and being connected to the short segments of the first disc and being directly rotatable by said motor on said element, the disc brushes being also geared to said motor at the same respective ratios as their complementary discs are geared to each other, whereby during the rotation of the system the disc brushes (J, J¹) remain on the small segments of their disc, so long as the brushes (H, H¹) of the first disc assume a relation to their disc segments in which the original direction of current flow to the motor is preserved, whereas the disc brushes (J, J¹) move into contact with their large disc segments, as soon as the brushes (H, H¹) of the first disc arrive in a position relatively to their disc segments, in which this original direction of current flow is disturbed.

3. In a control device of the character described the combination of an adustable transmitter element, a motor to be controlled, a receiving operating device near said motor and connections between said transmitter and said receiving device, a source of current and a resistance element adapted to be adjusted by said operating device, of a plurality of commutator discs (F, G) each have a pair of oppositely disposed small and large contact segments, and means for rotating said discs from said operating disc whereby the rotation speed of the first disc (F) is a submultiple of the speed of the operating device, and the speed of the second disc (G) a submultiple of the speed of the first disc, the large segments of each disc being connected directly to said source of current, an oppositely disposed pair of brushes for each disc, the brushes (J, J¹) of the second disc being directly connected to the motor armature, the brushes (H, H¹) of the first disc being connected to the small segments of the second disc, an oppositely disposed pair of brushes (D, D¹) disposed on said resistance element and being connected to the short segments of the first disc and being rotatable by said motor on said element, the disc brushes being also geared to said motor at the same respective ratios as their complementary disc are geared to each other, whereby during the rotation of the system the disc brushes (J, J¹) remain on the small segments of their disc, so long as the brushes (H, H¹) of the first disc assume a relation to their disc segments in which the original direction of current flow to the motor is preserved, whereas the disc brushes (J, J¹) move into contact with their large disc segments, as soon as the brushes H, H¹ of the first disc arrive in a position relatively to their disc segments, in which this original direction of current flow is disturbed, the relative speed of rotation of the second disc (G) to the motor speed being such that when the range limit of transmitter adjustment is reached, the brushes (J, J¹) of said disc have arrived near the ends of the large segments of said disc.

4. In combination with a direct current motor, a source of supply, a resistance element, a control switching means for variably connecting a motor to the line through said resistance element, said switching means comprising a plurality of contacts movable with respect to said resistance element, and a second switching means operatively connected with said first switching means for automatically connecting said motor to the line, direct, on a given relative movement of said contacts, with respect to said resistance element.

5. In combination with a direct current motor, a source of supply, a resistance element, a control switching means for variably connecting a motor to the line through said resistance element, said switching means comprising a plurality of contacts movable with respect to said resistance element, and a second switching means operatively connected with said first switching means for automatically connecting said motor to the line, direct, on a given relative movement of said contacts, with respect to said resistance element, said second switching means also having one of the switching elements controlled by the motion of said motor.

The foregoing specification signed at Essen, Germany, this 27th day of May, 1920.

MAX WISSINGER.

In presence of—
HANS GOTTSMANN,
JOSEF WERTZ.